United States Patent
Wang et al.

(10) Patent No.: US 8,431,917 B2
(45) Date of Patent: Apr. 30, 2013

(54) SYSTEM AND METHOD FOR ROTARY MACHINE ONLINE MONITORING

(75) Inventors: Guanghua Wang, Clifton Park, NY (US); Jeremy Clyde Bailey, Middle Grove, NY (US); Nirm Velumylum Nirmalan, Niskayuna, NY (US); Lucy Joelle Summerville, Greenville, SC (US); James Peter DeLancey, Corinth, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 12/976,813

(22) Filed: Dec. 22, 2010

(65) Prior Publication Data

US 2012/0162192 A1    Jun. 28, 2012

(51) Int. Cl.
*G01N 21/00* (2006.01)
*G01V 8/00* (2006.01)

(52) U.S. Cl.
USPC .......... 250/559.05; 250/559.07; 382/152; 356/237.3

(58) Field of Classification Search ............ 250/559.04, 250/559.05, 559.07, 559.08, 231.13, 330; 356/600, 237.1, 237.2, 237.3; 382/152, 284, 382/285
See application file for complete search history.

(56) References Cited

U.S. PATENT DOCUMENTS

| | | | |
|---|---|---|---|
| 6,771,296 B2 | 8/2004 | Hayashi et al. | |
| 6,992,315 B2* | 1/2006 | Twerdochlib | 250/559.08 |
| 7,432,505 B2 | 10/2008 | Brummel | |
| 7,501,630 B2 | 3/2009 | Russell | |
| 7,619,728 B2* | 11/2009 | Ogburn et al. | 356/237.1 |
| 2008/0101683 A1* | 5/2008 | Zombo et al. | 382/141 |
| 2009/0175525 A1 | 7/2009 | Farrer et al. | |
| 2010/0220182 A1 | 9/2010 | Krull | |
| 2011/0267428 A1 | 11/2011 | George et al. | |

* cited by examiner

*Primary Examiner* — Kevin Pyo
(74) *Attorney, Agent, or Firm* — Ann M. Agosti

(57) ABSTRACT

In one embodiment, a system includes an optical monitoring system configured to optically communicate with an interior of a rotary machine. The optical monitoring system is configured to redirect a field of view toward different regions of a component within the interior of the rotary machine while the rotary machine is in operation, and to capture an image of each region.

10 Claims, 6 Drawing Sheets

SYSTEM AND METHOD FOR ROTARY MACHINE ONLINE MONITORING

BACKGROUND OF THE INVENTION

The subject matter disclosed herein relates to a system and method for rotary machine online monitoring.

Certain gas turbine engines include a turbine having viewing ports configured to facilitate monitoring of various components within the turbine. For example, a pyrometry system may be in optical communication with the viewing ports and configured to measure the temperature of certain components within a hot gas path of the turbine. In addition, an optical monitoring system may be coupled to the viewing ports and configured to capture two-dimensional images of the turbine components. Certain optical monitoring systems are configured to provide online monitoring, i.e., capturing images of the turbine components during operation of the turbine. Such optical monitoring systems may include an objective lens directed toward the turbine components, and configured to relay an image of the components to a detector via an optical connection (e.g., borescope, endoscope, fiberscope, etc.). Unfortunately, because the position and orientation of each viewing port is fixed relative to the turbine casing, certain portions of each turbine component (e.g., turbine blade tip, platform, etc.) may be outside of the field of view.

Furthermore, if the objective lens is configured to provide a narrow field of view, particular regions of the turbine components may be monitored with a high spatial resolution. Conversely, if the objective lens is configured to provide a wide field of view, a significant portion of each component may be monitored, but the spatial resolution will be reduced. Consequently, typical optical monitoring systems may only monitor limited regions of the component with high spatial resolution or larger regions of the component with low spatial resolution.

BRIEF DESCRIPTION OF THE INVENTION

In one embodiment, a system includes an optical monitoring system configured to optically communicate with an interior of a rotary machine. The optical monitoring system is configured to redirect a field of view toward different regions of a component within the interior of the rotary machine while the rotary machine is in operation, and to capture an image of each region.

In another embodiment, a system includes an optical monitoring system configured to optically communicate with an interior of a rotary machine. The optical monitoring system includes a light redirecting device configured to redirect a field of view toward different regions of a component within the interior of the rotary machine while the rotary machine is in operation. The optical monitoring system also includes a detector array in optical communication with the light redirecting device. The detector array is configured to capture an image of each region.

In a further embodiment, a method includes redirecting a field of view toward different regions of a component within an interior of a rotary machine while the rotary machine is in operation. The method also includes capturing an image of each region.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
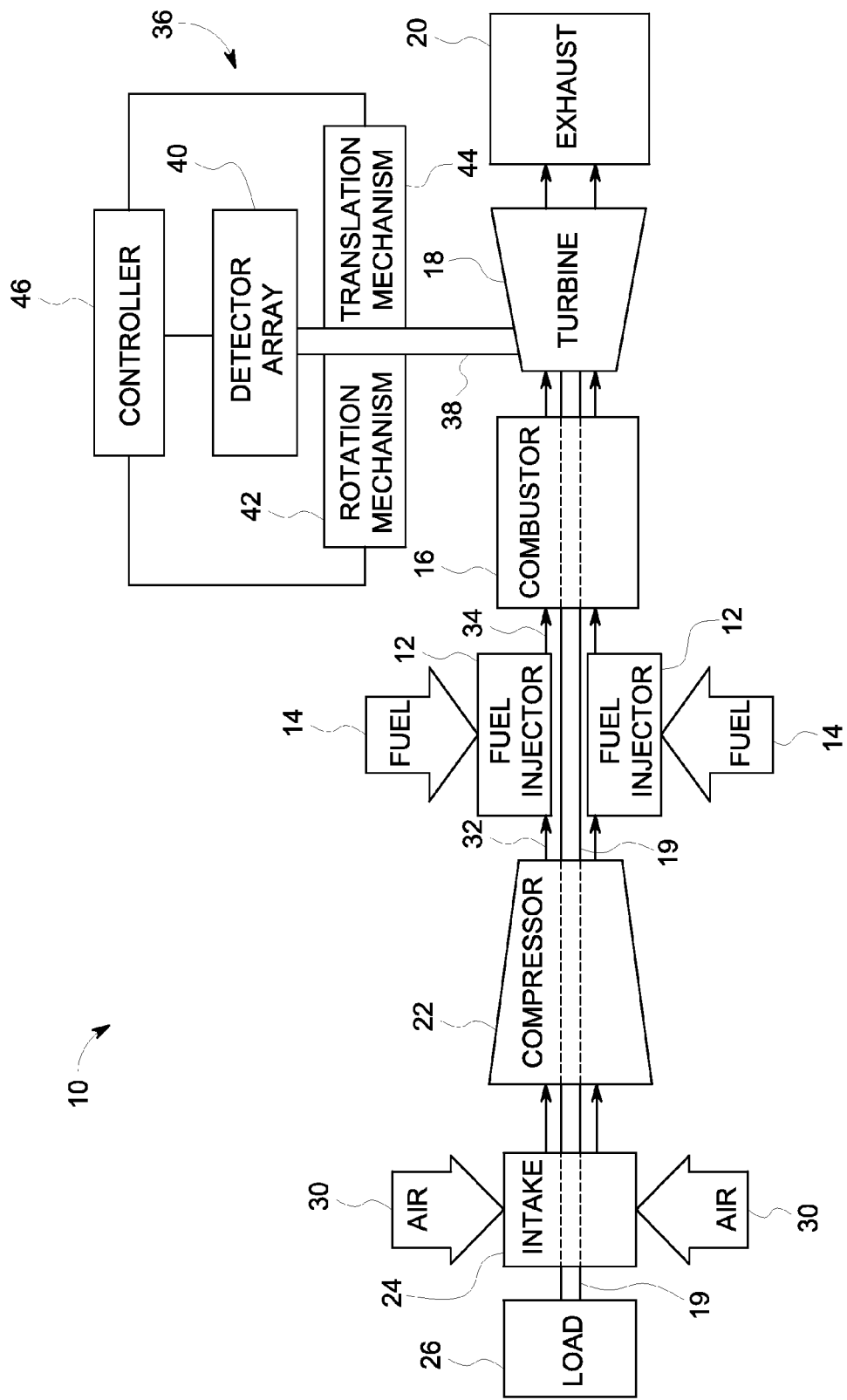
FIG. 1 is a block diagram of an embodiment of a turbine system including an optical monitoring system configured to redirect a field of view toward different regions of a turbine component, and to capture an image of each region.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may enhance online monitoring of turbine components by providing an optical monitoring system capable of redirecting a field of view toward different regions of each turbine component. In one embodiment, the optical monitoring system is configured to optically communicate with an interior of a turbine. The optical monitoring system includes a light redirecting device configured to redirect a field of view toward different regions of a component within the interior of the turbine while the turbine is in operation. The optical monitoring system also includes a detector array in optical communication with the light redirecting device. The detector array is configured to capture an image of each region. In certain embodiments, the optical monitoring system includes a rotation mechanism configured to rotate the light redirecting device about an axis of rotation. In such embodiments, the optical monitoring system may capture images of different regions of the component by rotating the light redirecting device. In further embodiments, the optical monitoring system includes a translation mechanism configured to move the light redirecting device relative to the component. Such embodiments may provide an expanded field of view when the light redirecting device is positioned farther from the component and a narrower field of view when the light redirecting device is positioned closer to the component. In addition, the translation mechanism may be configured to fully retract the light redirecting device inside the view port to substantially reduce particle accumulation on the exterior surface and/or to remove the light redirecting device from the hot gas stream. As a result, the useful operating life of the light redirecting device may be substantially extended.

The optical monitoring system may also include a controller configured to map the image of each region onto a three-dimensional model of the component. By viewing the surface-mapped three-dimensional model, an operator may easily associate elements of the image with locations on the turbine component. Consequently, the operator may be able to identify blocked cooling holes within turbine blades, estimate the remaining life of the turbine component and/or determine a desired inspection interval. As a result, the reliability and/or availability of the turbine system may be significantly enhanced.

Turning now to the drawings, FIG. 1 is a block diagram of an embodiment of a turbine system including an optical monitoring system configured to redirect a field of view toward different regions of a turbine component, and to capture an image of each region. While a turbine system is described below, it should be appreciated that the optical monitoring system may be utilized to monitor components within other rotary machines or turbo machines, such as a compressor, a jet engine, a pump, or a steam turbine, for example. The illustrated turbine system 10 includes a fuel injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized gas into a turbine 18. As will be appreciated, the turbine 18 includes one or more stators having fixed vanes or blades, and one or more rotors having blades which rotate relative to the stators. The hot gas stream passes through the turbine rotor blades, thereby driving the turbine rotor to rotate. Coupling between the turbine rotor and a shaft 19 will cause the rotation of the shaft 19, which is also coupled to several components throughout the gas turbine system 10, as illustrated. Eventually, the gas stream may exit the gas turbine system 10 via an exhaust outlet 20.

A compressor 22 includes blades rigidly mounted to a rotor which is driven to rotate by the shaft 19. As air passes through the rotating blades, air pressure increases, thereby providing the combustor 16 with sufficient air for proper combustion. The compressor 22 may intake air to the gas turbine system 10 via an air intake 24. Further, the shaft 19 may be coupled to a load 26, which may be powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 34, into the combustor 16. Alternatively, the compressed air 32 and fuel 14 may be injected directly into the combustor for mixing and combustion.

As illustrated, the turbine system 10 includes an optical monitoring system 36 optically coupled to the turbine 18. In the illustrated embodiment, the optical monitoring system 36 includes an optical connection 38 (e.g., borescope, endoscope, fiberscope, etc.) extending from a detector array 40 into the turbine 18. As discussed in detail below, a light redirecting device (e.g., prism, minor, etc.) is coupled to an end of the optical connection 38, and configured to redirect a field of view toward different regions of a component within the interior of the turbine 18 while the turbine is in operation. As a result, the detector array 40 may capture an image of each region of the turbine component. For example, in the illustrated embodiment, the optical monitoring system 36 includes a rotation mechanism 42 and a translation mechanism 44. The rotation mechanism 42 is configured to rotate the light redirecting device to redirect the field of view toward the different regions of the component. In addition, the translation mechanism 44 is configured to move the light redirecting device relative to the component to either expand or narrow the field of view. Furthermore, the translation mechanism 44 may be configured to move the light redirecting device away from the hot gas stream within the turbine 18 when the optical monitoring system 36 is not in use, thereby substantially increasing the operational life of the light redirecting device. By redirecting the field of view toward different regions of the turbine component, the optical monitoring system 36 may monitor a substantial portion of the component surface with a narrow field of view, thereby generating high spatial resolution images. As a result, an operator may be able to identify minute defects within the turbine component, such as blocked cooling holes, loss of thermal barrier coating (TBC), and/or cracks within the turbine components.

In the illustrated embodiment, the detector array 40 is communicatively coupled to a controller 46. In certain embodiments, the controller 46 is configured to map the image of each region onto a three-dimensional model of the component. For example, the controller 46 may instruct the rotation mechanism 42 to direct the light redirecting device toward desired regions of the component, and to map resultant images of each desired region onto the three-dimensional model of the component. Because an operator may view the two-dimensional image mapped onto the three-dimensional model, the operator may easily associate elements of the image with locations on the turbine component. Consequently, the operator may be able to identify blocked cooling holes within turbine blades, estimate the remaining life of the turbine component and/or determine a desired inspection interval.

Figure 2:
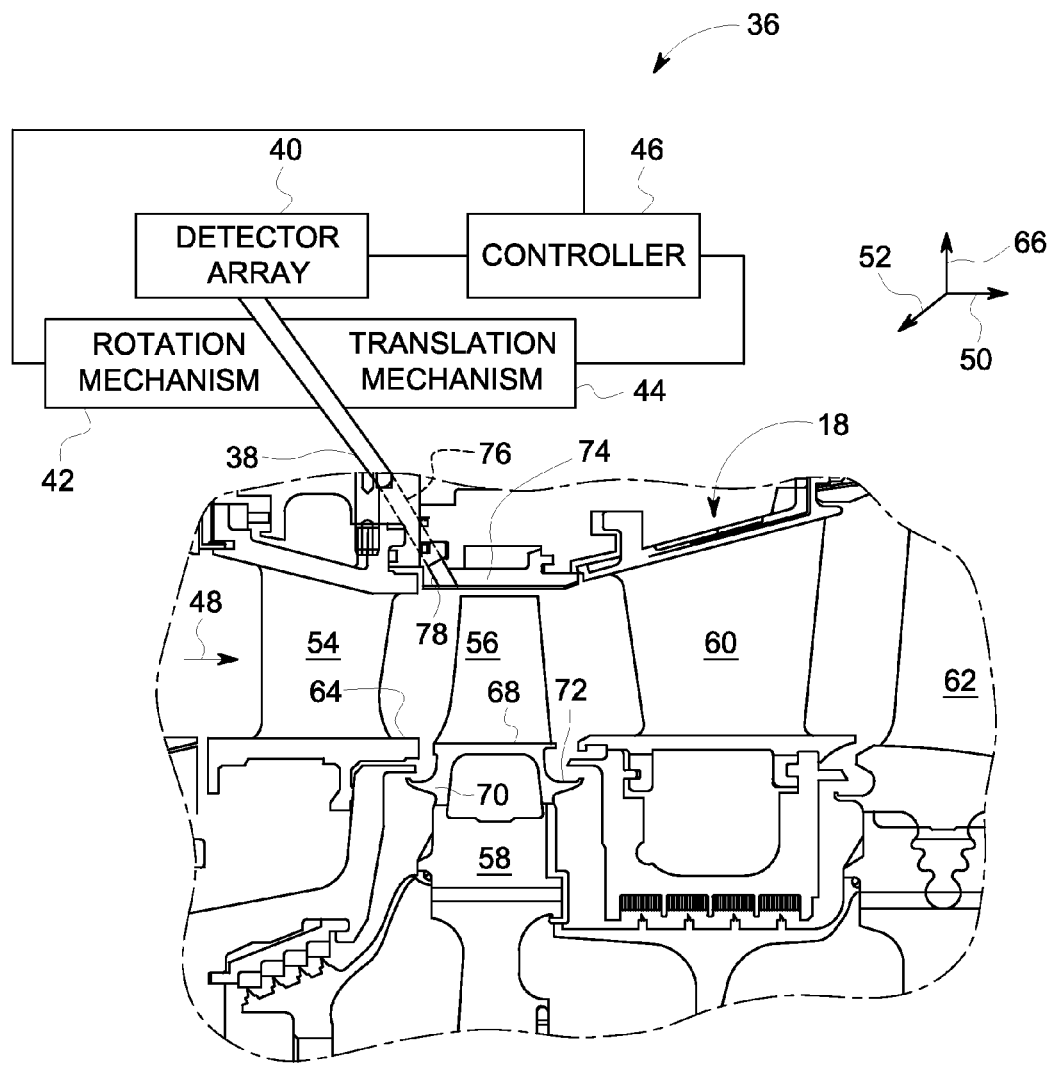
FIG. 2 is a cross-sectional view of an exemplary turbine section, illustrating various turbine components that may be monitored by an embodiment of the optical monitoring system.

FIG. 2 is a cross-sectional view of an exemplary turbine section, illustrating various turbine components that may be monitored by an embodiment of the optical monitoring system 36. As illustrated, hot gas stream 48 from the combustor 16 flows into the turbine 18 in an axial direction 50 and/or a circumferential direction 52. The illustrated turbine 18 includes at least two stages, with the first two stages shown in FIG. 2. Other turbine configurations may include more or fewer turbine stages. For example, a turbine may include 1, 2, 3, 4, 5, 6, or more turbine stages. The first turbine stage includes vanes 54 and blades 56 substantially equally spaced in the circumferential direction 52 about the turbine 18. The first stage vanes 54 are rigidly mounted to the turbine 18 and configured to direct combustion gases toward the blades 56. The first stage blades 56 are mounted to a rotor 58 that is driven to rotate by the hot gas stream 48 flowing through the blades 56. The rotor 58, in turn, is coupled to the shaft 19, which drives the compressor 22 and the load 26. The hot gas 48 then flows through second stage vanes 60 and second stage blades 62. The second stage blades 62 are also coupled to the rotor 58. As the hot gas stream 48 flows through each stage, energy from the gas is converted into rotational energy of the rotor 58. After passing through each turbine stage, the hot gas 48 exits the turbine 18 in the axial direction 50.

In the illustrated embodiment, each first stage vane 54 extends outward from an endwall 64 in a radial direction 66. The endwall 64 is configured to block hot gas 48 from entering the rotor 58. A similar endwall may be present adjacent to the second stage vanes 60, and subsequent downstream vanes, if present. Similarly, each first stage blade 56 extends outward from a platform 68 in the radial direction 66. As will be appreciated, the platform 68 is part of a shank 70 which couples the blade 56 to the rotor 58. The shank 70 also includes a seal, or angel wing, 72 configured to block hot gas 48 from entering the rotor 58. Similar platforms and angel wings may be present adjacent to the second stage blades 62, and subsequent downstream blades, if present. Furthermore, a shroud 74 is positioned radially outward from the first stage blades 56. The shroud 74 is configured to minimize the quantity of hot gas 48 that bypasses the blades 56. Gas bypass is undesirable because energy from the bypassing gas is not captured by the blades 56 and translated into rotational energy. While embodiments of the optical monitoring system 36 are described below with reference to monitoring components within the turbine 18 of a gas turbine engine 10, it should be appreciated that the optical monitoring system 36 may be employed to monitor components within other rotary machines, such as a jet engine, a steam turbine or a compressor, for example.

As illustrated, the optical connection 38 extends into an interior of the turbine 18 through an inspection port 76. As will be appreciated, inspection ports may be positioned at various locations along the turbine casing to facilitate inspection of turbine components while the turbine is deactivated. In the illustrated embodiment, the optical monitoring system 36 is configured to monitor turbine components during operation of the turbine 18 to enable an operator or automated system to detect defects (e.g., blocked cooling holes, loss of TBC, crack formation, creep, etc.) within the components while the turbine is operating. While the illustrated embodiment includes a single optical connection 38 directed toward the first stage blades 56, it should be appreciated that alternative embodiments may include more optical connections 38. For example, certain embodiments may employ 1, 2, 3, 4, 5, 6, 7, 8, or more optical connections 38 to convey images of each blade 56 to the detector array 40. As will be appreciated, the more optical connections 38 employed, the more regions of the blade 56 that may be monitored. Furthermore, the optical connection 38 may include an imaging optical system such as a borescope, endoscope or fiberscope, for example.

While the optical connection 38 is directed toward the first stage blades 56 in the illustrated embodiment, it should be appreciated that the optical connection 38 may be directed toward other turbine components in alternative embodiments. For example, one or more optical connections 38 may be directed toward the first stage vanes 54, the second stage vanes 60, the second stage blades 62, the endwalls 64, the platforms 68, the angel wings 72, the shrouds 74, or other components within the turbine 18. Further embodiments may include optical connections 38 directed toward multiple components within the turbine 18. Similar to the first stage blades 56, the optical monitoring system 36 may capture images of different regions of each component, thereby enabling an operator to readily identify defects (e.g., excessive temperatures, cracks, blocked cooling holes, etc.) within the turbine components. In addition, the optical monitoring system 36 may be configured to monitor components within an interior of the compressor 22 (e.g., blades, vanes, etc.) and/or an interior of the combustor 16 (e.g., liner, fuel nozzle, etc.).

As previously discussed, the optical connection 38 conveys an image from the turbine 18 to the detector array 40. The detector array 40 may be configured to capture multiple images over a period of time. As will be appreciated, certain turbine components, such as the first stage blades 56 described above, may rotate at high speed along the circumferential direction 52 of the turbine 18. Consequently, to capture an image of such components, the detector array 40 may be configured to operate at an integration time sufficient to provide the controller 46 with a high spatial resolution image of each component. For example, in certain embodiments, the detector array 40 may be configured to output a signal indicative of the image of the turbine component with an integration time shorter than about 10, 5, 3, 2, 1, or 0.5 microseconds, or less.

In embodiments employing multiple optical connections 38, the optical connections 38 may be coupled to a multiplexer within the detector array 40 to facilitate monitoring images from each observation point. As will be appreciated, images from each optical connection 38 may be multiplexed in space, time or wavelength. For example, if the multiplexer is configured to multiplex the images in space, each image may be projected onto a different portion of an image sensing device (e.g., charge-coupled device (CCD), complementary metal oxide semiconductor (CMOS), focal plane array (FPA), etc.) within the detector array 40. In this configuration, an image from a first optical connection may be directed toward an upper portion of the image sensing device, an image from a second optical connection may be directed toward a central portion of the image sensing device, and an image from a third optical connection may be directed toward a lower portion of the image sensing device, for example. As a result, the image sensing device may scan each image at one-third resolution. In other words, scan resolution is inversely proportional to the number of spatially multiplexed signals. As will be appreciated, lower resolution scans provide the controller 46 with less information about the turbine component than higher resolution scans. Therefore, the number of spatially multiplexed signals may be limited by the minimum desired resolution.

Alternatively, images provided by multiple optical connections may be multiplexed in time. For example, the detector array 40 may alternately scan an image from each optical connection 38 using the entire resolution of the image sensing device. Using this technique, the full resolution of the image sensing device may be utilized, but the scanning frequency may be reduced proportionally to the number of observation points scanned. For example, if two observation points are scanned and the image sensing device frequency is 100 Hz, the detector array 40 is only able to scan images from each observation point at 50 Hz. Therefore, the number of temporally multiplexed signals may be limited by the desired scanning frequency.

In addition, images provided by multiple optical connections may be multiplexed in wavelength. For example, an image from a first optical connection may include spectral information within a first narrow wavelength band, and an image from a second optical connection may include spectral information within a second narrow wavelength band, different from the first narrow wavelength band. In such a configuration, a multi-spectral detector array 40 may concurrently scan both images using the entire resolution of the image sensing device. As will be appreciated, receiving two images of a turbine component having different wavelength bands may enable the optical monitoring system 36 to filter the interference from the hot gas stream 48, thereby enabling the controller 46 to accurately measure the radiation emitted by the component. Using this technique, the full resolution of the image sensing device may be utilized, but the signal intensity may be reduced proportionally to the number of wavelength ranges scanned. In other words, signal intensity is inversely proportional to the number of wavelength ranges. Therefore, the number of wavelength ranges may be limited by the detector array sensitivity.

In certain embodiments, the optical monitoring system 36 may be configured to determine a temperature of the turbine component based on an intensity of radiation emitted by the component. For example, the blade 56 will emit radiation over a wide range of wavelengths as the temperature of the blade increases. In addition, certain combustion products species, such as water vapor and carbon dioxide, absorb and emit radiation over a wide range of wavelengths in response to increased temperature. As a result, during operation of the gas turbine engine 10, only a fraction of wavelengths emitted by the blade 56 reach the optical monitoring system 36 with sufficient intensity and negligible interference for accurate intensity measurement. Consequently, the optical monitoring system 36 may be configured to measure the intensity of certain wavelengths which are more likely to pass through the hot gas stream 48 without significant absorption or interference to determine the temperature of the blade 56. For example, wavelengths within the red portion of the visible spectrum and/or within the near infrared spectrum may pass through the hot gas stream 48 with less absorption than other frequency ranges. Therefore, certain embodiments may utilize such frequency ranges for determining the temperature of the blade 56. For example, certain optical monitoring systems 36 may be configured to measure the intensity of wavelengths within a range of approximately 0.5 to 1.4 microns, 1.5 to 1.7 microns, and/or 2.1 to 2.4 microns to determine blade temperature. However, it should be appreciated that alternative embodiments may measure an intensity of electromagnetic radiation within other portions of the visible, infrared and/or ultraviolet spectra.

In the illustrated embodiment, a light redirecting device 78 (e.g., prism, minor, etc.) is coupled to an end of the optical connection 38, opposite from the detector array 40. The light redirecting device 78 is configured to redirect a field of view toward different regions of a turbine component (e.g., first stage blade 56). As discussed in detail below, the light redirecting device 78 may direct a field of view toward a pressure surface of each blade 56. As the blades 56 rotate in the circumferential direction 52, each blade will pass through the field of view, thereby enabling the optical monitoring system 36 to capture an image of the pressure surface. The rotation mechanism 42 may then rotate the light redirecting device 78 toward a suction surface of each blade 56. As the blades 56 rotate in the circumferential direction 52, each blade will pass through the field of view, thereby enabling the optical monitoring system 36 to capture an image of the suction surface. The rotation mechanism 42 may then rotate the light reflecting device 78 toward other regions of the blades 56 such that a substantial portion of the surface of each blade 56 is monitored. Due to the narrow field of view associated with each image, minute defects (e.g., smaller than about 500 microns, or less) may be detectable throughout the surface of each blade 56. In addition, because images covering a substantial portion of the blade surface are captured, the controller 46 may map the images onto a three-dimensional model of the blade, thereby enhancing online monitoring of surface defects.

As previously discussed, the optical monitoring system 36 also includes a translation mechanism 44 configured to move the light redirecting device 78 relative to the turbine component (e.g., first stage blade 56). As will be appreciated, moving the light redirecting device 78 closer to the component will narrow the field of view, while moving the light redirecting device 78 farther from the component will expand the field of view. Consequently, the field of view may be adjusted, at least in part, by moving the light redirecting device 78 to a desired distance from the component. In addition, the translation mechanism 44 may be configured to move the light redirecting device 78 farther from the hot gas stream 48 when the optical monitoring system 36 is not in operation. As a result, the useful operating life of the light redirecting device 78 and/or the optical connection 38 may be substantially extended.

Figure 3:
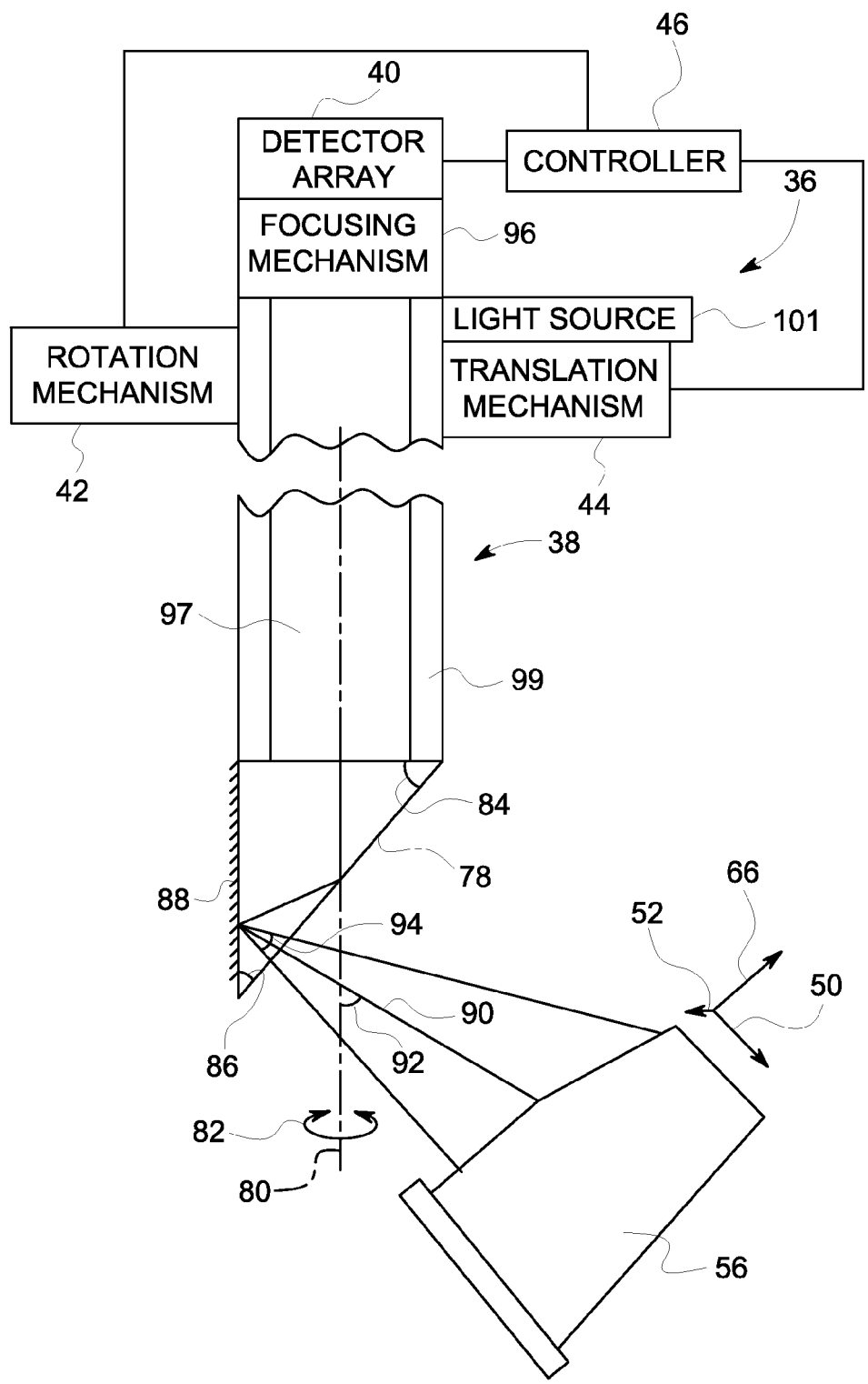
FIG. 3 is a schematic diagram of an exemplary light redirecting device configured to rotatably redirect a field of view about an axis of rotation.

FIG. 3 is a schematic diagram of an exemplary light redirecting device 78 configured to rotatably redirect a field of view about an axis of rotation. In the illustrated embodiment, the light redirecting device 78 is a triangular prism including 30 degree, 60 degree and 90 degree angles. This type of prism may be described as a Littrow prism. As illustrated, the prism 78 is configured to rotate about an axis 80 in a direction 82, thereby directing the field of view toward different regions of the turbine component, such as the illustrated first stage blade 56. In the illustrated embodiment, the Littrow prism 78 includes a first angle 84 and a second angle 86. The first angle 84 is about 60 degrees and the second angle 86 is about 30 degrees. The prism 78 also includes a reflective coating 88 disposed on a side opposite from the first angle 84. In this configuration, an exemplary beam of light 90 entering the prism 78 at an angle 92 will be reflected by the surfaces of the prism 78, as shown in FIG. 3, and will enter the detector array 40. Based on the geometry of the Littrow prism described above, the angle 92 is about 60 degrees. Therefore, as the prism 78 rotates, the detector array 40 may capture images of regions located about 60 degrees from the axis 80. Furthermore, the field of view may be defined by a viewing angle 94 relative to the exemplary light beam 90. The viewing angle 94 may vary based on the detector array configuration and/or optics positioned between the prism 78 and the detector array 40. For example, the viewing angle 94 may be greater than 0 degrees and less than 90 degrees. In certain embodiments, the viewing angle 94 may range between about 0 to 90 degrees, about 0 to 60 degrees, about 0 to 45 degrees, about 0 to 30 degrees, or about 0 to 15 degrees. Further embodiments may employ prisms 78 having different geometric configurations to provide different angles between the exemplary light beam 90 and the rotation axis 80. In addition, while a prism is described above, it should be appreciated that alternative embodiments may employ other light redirecting devices, such as a minor or angled light guide, for example.

As previously discussed, a rotation mechanism 42 (e.g., electric motor) is coupled to the optical connection 38, and configured to rotate the light redirecting device 78 to redirect the field of view toward different regions of the turbine component. Similarly, a translation mechanism 44 (e.g., electric motor) is coupled to the optical connection 38, and configured to move the light redirecting device 78 relative to the component. As will be appreciated, adjusting the distance between the light redirecting device 78 and the turbine component will affect the focal point of light incident upon the detector array 40. Consequently, the illustrated embodiment includes a focusing mechanism 96 positioned between the optical connection 38 and the detector array 40. The focusing mechanism 96 is configured to automatically adjust the focal point to compensate for variations in distance between the light redirecting device 78 and the turbine component. As a result, the detector array will capture images having high spatial resolution, thereby facilitating detection of minute defects (e.g., less than 500 microns) within the turbine component.

The optical monitoring system 36 may also include an objective lens configured to focus the light emitted and/or reflected by the turbine blade 56 onto the optical connection 38. In certain embodiments, the objective lens may be positioned adjacent to an outer surface of the prism 78 such that the lens widens or narrows the field of view. Alternatively, the objective lens may be positioned between the prism 78 and the optical connection 38. In further embodiments, the objective lens may be integral with the prism 78, thereby obviating a separate lens to focus the light from the turbine component.

As previously discussed, certain embodiments may employ prisms 78 having different geometric configurations to provide different angles between the exemplary light beam 90 and the rotation axis 80. For example, while a three-sided prism is employed in the illustrated embodiment, it should be appreciated that a prism having 4, 5, 6, or more sides may be utilized in alternative embodiments. In addition, it should be appreciated that various combinations of angles, reflective coatings and non-reflective coatings may be employed to establish a desired angle 92 between the exemplary light beam 90 and the rotation axis 80. In alternative embodiments, a minor may be employed to establish a desired angle 92 of the exemplary light beam 90. For example, a minor may be positioned adjacent to the end of the optical connection 38 and angled to reflect light from the turbine blade 56 to the optical connection. In such an embodiment, an objective lens may be positioned between the minor and the turbine component, or between the optical connection 38 and the minor.

In the illustrated embodiment, the optical connection 38 includes an inner core 97 and an outer layer 99. Both the inner core 97 and the outer layer 99 include a light transmissive material (e.g., optical fibers, light guide, etc.) configured to facilitate light passage through the optical connection 38. In the illustrated embodiment, the outer layer 99 is configured to transmit light from a light source 101 to the prism 78, and the inner core 97 is configured to transmit light from the prism 78 to the detector array 40. In this configuration, the light source 101 may project light onto the turbine blade 56 such that the detector array 40 captures an image of the light reflected off the blade 56. As will be appreciated, the light source 101 may include any suitable device configured to emit radiation at a desired wavelength (e.g., light emitting diode, arc lamp, flash lamp, etc.). For example, the light source 101 may be configured to emit light within a visible, infrared or ultraviolet spectrum, which substantially corresponds to the wavelength range of the detector array 40. In certain embodiments, the light source 101 may be configured to pulse at high frequencies to enable the detector array 40 to capture high spatial resolution images of the rotating turbine blades 56. In further embodiments, the light source may be directed toward the turbine component from a secondary inspection port 76, thereby obviating the outer layer 99 of the optical connection 38. In alternative embodiments, the detector array 40 may be configured to capture radiation (e.g., infrared wavelengths) emitted by the high-temperature turbine blade 56. In such embodiments, the light source 101 and the outer layer 99 may be omitted.

Figure 4:
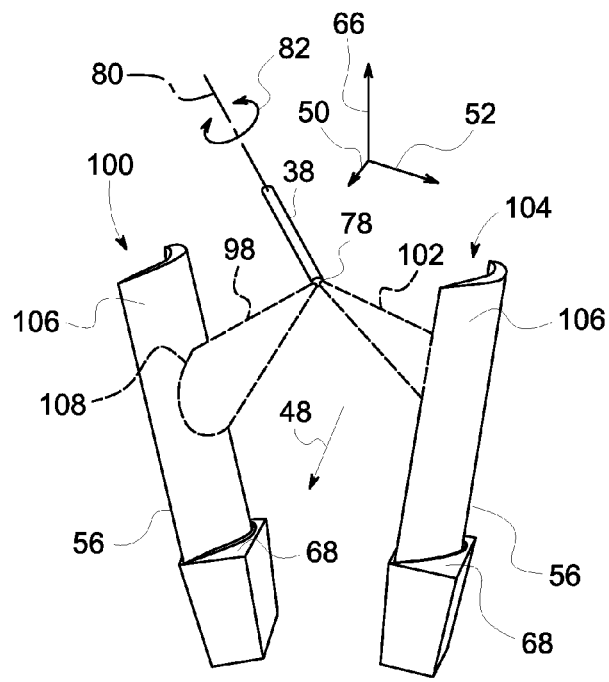
FIG. 4 is a back perspective view of an exemplary light redirecting device directed toward a turbine blade in a first position and in a second position.

FIG. 4 is a back perspective view of an exemplary light redirecting device directed toward a turbine blade in a first position and in a second position. As previously discussed, the turbine blades 56 are configured to rotate in the circumferential direction 52. Consequently, the optical monitoring system 36 may capture images of different regions of each blade as the blades rotate. For example, the optical monitoring system 36 may capture a first side of each blade as the blade approaches the light redirecting device 78, and capture a second side of each blade as the blade moves away from the light redirecting device. In the illustrated embodiment, a first field of view 98 is directed toward the turbine blade 56 in a first position 100, and a second field of view 102 is directed toward the turbine blade 56 in a second position 104. As illustrated, the first field of view 98 is directed toward a suction surface 106 of the blade 56, thereby enabling the optical monitoring system 36 to capture an image of a first region 108 of the suction surface 106.

Because the blades 56 rotate in the circumferential direction 52, the optical monitoring system 36 may capture an image of the first region 108 of each blade 56 as the blades enter the first field of view 98. Once an image of the first region 108 of each blade 56 is captured, the controller 46 may instruct the rotation mechanism 42 to rotate the light redirecting device 78 toward the second blade position 104. As discussed in detail below, the optical monitoring system 36 may then capture an image of a different region of the blade 56. While two fields of view are shown in the illustrated embodiment, it should be appreciated that additional fields of view may be utilized to capture images of other portions of the blade 56, such as the tip and the platform 68, for example. In addition, the optical monitoring system 36 may be employed to capture images of other turbine components, such as shrouds, angel wings and vanes, among other turbine components.

Figure 5:
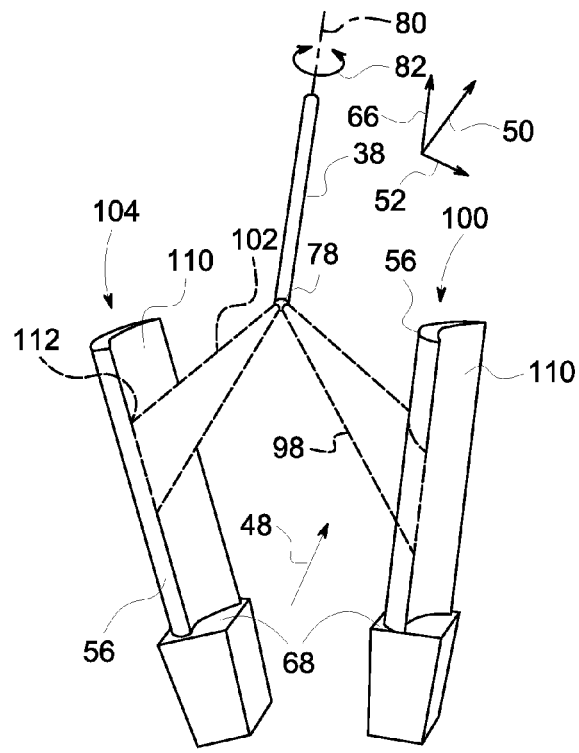
FIG. 5 is a front perspective view of the exemplary light redirecting device shown in FIG. 4.

FIG. 5 is a front perspective view of the exemplary light redirecting device shown in FIG. 4. As illustrated, the second field of view 102 is directed toward a pressure surface 110 of the blade 56, thereby enabling the optical monitoring system 36 to capture an image of a second region 112 of the pressure surface 110. Because the blades 56 rotate in the circumferential direction 52, the optical monitoring system 36 may capture an image of the second region 112 of each blade 56 as the blades enter the second field of view 102. By redirecting the field of view toward different regions of each blade, a substantial portion of the surface of the blade may be monitored with high spatial resolution, thereby facilitating detection of minute defects (e.g., less than 500 microns) within the blade. In addition, once images covering a substantial portion of the surface of each blade have been captured, the images may be mapped onto a three-dimensional model of the blade, thereby further enhancing detection of blade defects.

Figure 6:
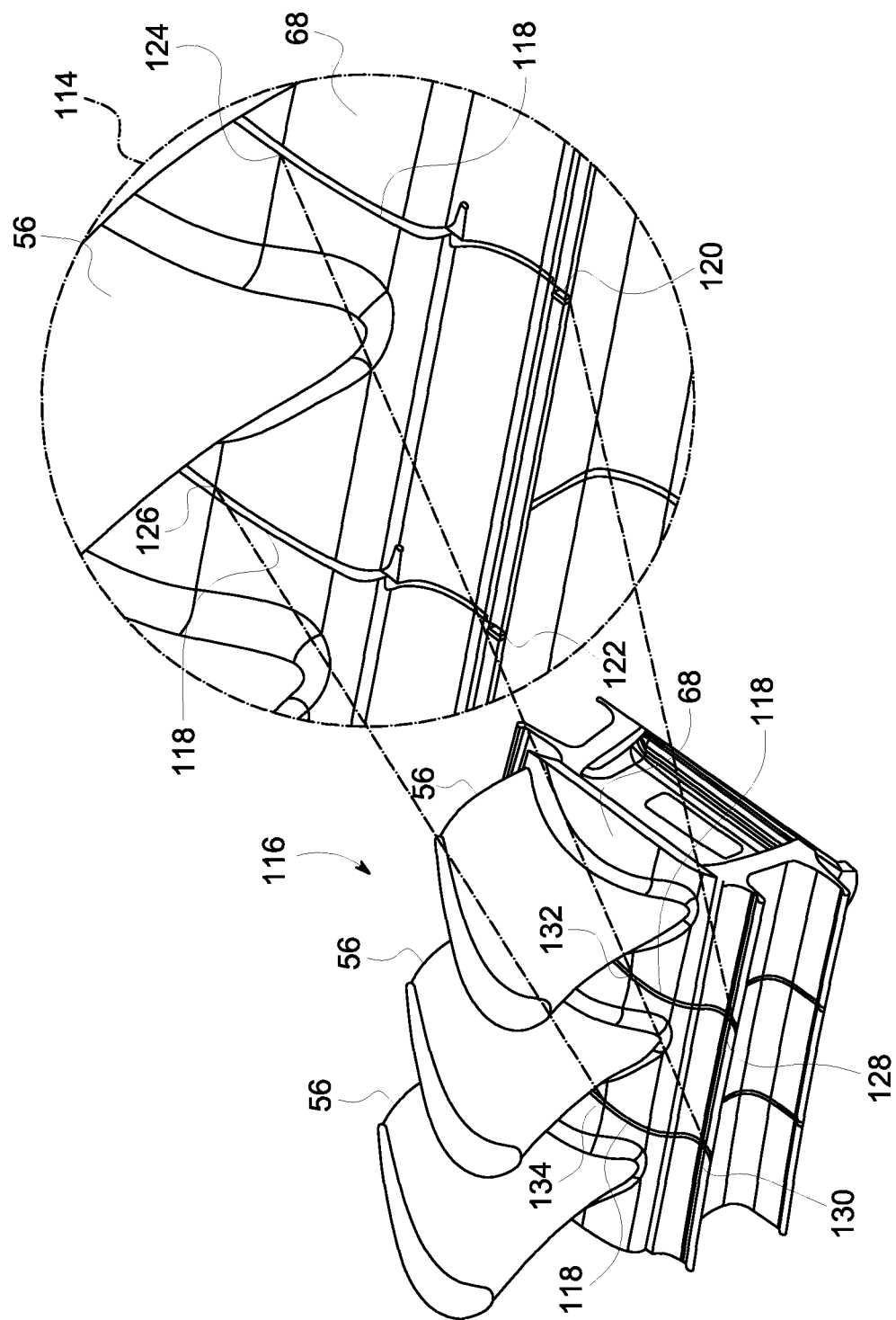
FIG. 6 is a diagram illustrating an exemplary technique for mapping an image of a turbine component onto a three-dimensional model of the turbine component.

FIG. 6 is a diagram illustrating an exemplary technique for mapping an image of a turbine component onto a three-dimensional model of the turbine component. The process of applying the two-dimensional image onto the three-dimensional model begins with determining a transformation by mapping the two-dimensional image onto a two-dimensional projection of the three-dimensional model. In the illustrated embodiment, the process of determining the transformation includes aligning multiple reference points on the two-dimensional image with corresponding points on the two-dimensional projection of the three-dimensional model, and establishing a bilinear transformation based on the alignment. As illustrated, reference points of a two-dimensional image 114 of turbine blades 56 and platforms 68 are aligned with corresponding points of a two-dimensional projection 116 of a three-dimensional model of the monitored components. In the illustrated embodiment, the reference points are positioned along slash faces 118 of the platforms 68. However, it should be appreciated that the reference points may be located within other areas of the turbine component in alternative embodiments.

As illustrated, the two-dimensional image 114 includes a first reference point 120 positioned along a first slash face 118 at a tip of the platform 68, a second reference point 122 positioned along a second slash face 118 at a tip of the platform 68, a third reference point 124 positioned along the first slash face 118 at an inflection in the platform 68, and a fourth reference point 126 positioned along the second slash face 118 at an inflection in the platform 68. To establish the bilinear transformation, the first reference point 120 may be aligned with a first corresponding point 128 on the two-dimensional projection 116, the second reference point 122 may be aligned with a second corresponding point 130, the third reference point 124 may be aligned with a third corresponding point 132, and the fourth reference point 126 may be aligned with a fourth corresponding point 134. While four points are aligned in the illustrated embodiment, it should be appreciated that more points may be utilized in alternative embodiments. For example, certain embodiments may include 4, 5, 6, 7, 8, 9, 10, or more points to facilitate computation of the bilinear transformation.

By measuring the two-dimensional position of each reference point on the two-dimensional image 114 and each corresponding point on the two-dimensional projection 116 of the three-dimensional model, a bilinear transformation may be computed. As will be appreciated, a bilinear transformation may be calculated based on the following equations:

$$u = a_0 + a_1 x + a_2 y + a_3 xy$$

$$v = b_0 + b_1 x + b_2 y + b_3 xy$$

where (x, y) are the coordinates of each point on the two-dimensional image 114, (u, v) are the coordinates of each point on the two-dimensional projection 116 of the three-dimensional model, and $a_0, a_1, a_2, a_3, b_0, b_1, b_2$ and $b_3$ are parameters which define the bilinear transformation. Because the illustrated embodiment maps four reference points of the two-dimensional image 114 onto four corresponding points on the two-dimensional projection 116 of the three-dimensional model, a total of eight equations (i.e., two for each point) will be generated based on the above set of equations. As a result, the eight equations may be solved for the eight parameters ($a_0, a_1, a_2, a_3, b_0, b_1, b_2$ and $b_3$) which define the bilinear transformation. If more than four points are utilized, a least squares method may be employed to determine the eight parameters.

Once the bilinear transformation is computed, the transformation may be applied to the two-dimensional image 114 to establish a transformed image. For example, the position (e.g., (x, y) coordinates) of each point (e.g., pixel) on the two-dimensional image 114 may be transformed into a position (e.g., (u, v) coordinates) of a corresponding point on the transformed image via the above equations. While the illustrated embodiment utilizes a bilinear transformation, it should be appreciated that alternative embodiments may employ other transformations (e.g., affine, Procrustes, perspective, polynomial, etc.) to map the two-dimensional image 114 onto the two-dimensional projection 116 of the three-dimensional model.

The transformed image may then be applied to the three-dimensional model to establish a composite model (e.g., model having a mapped surface). For example, the illustrated embodiment may utilize an inverse perspective transformation to map the transformed image onto the three-dimensional model. As will be appreciated, the three-dimensional model includes a series of vertices or nodes which define the shape of the turbine component. The position of each node within the two-dimensional projection 116 of the three-dimensional model may be computed based on the position, orientation and field of view of the projection 116. Because the coordinates of the transformed image substantially correspond to the coordinates of the two-dimensional projection 116, the nodes of the transformed image may be aligned with the nodes of the three-dimensional model via the inverse perspective transform. The transformed image may then be mapped onto the three-dimensional model, thereby establishing the composite model. As will be appreciated, other transformations, such as an inverse orthogonal projection, may be utilized to apply the transformed image onto the three-dimensional model.

Because the optical monitoring system 36 is configured to capture images covering a substantial portion of the surface of the turbine component, a substantially complete composite model may be generated as each image is mapped onto the three-dimensional model. The complete composite model may enable an operator to identify blocked cooling holes and/or other anomalies more rapidly than observing two-dimensional images. Consequently, the operator may be able to efficiently estimate the remaining operational life of the component and/or determine a desired inspection interval.

Figure 7:
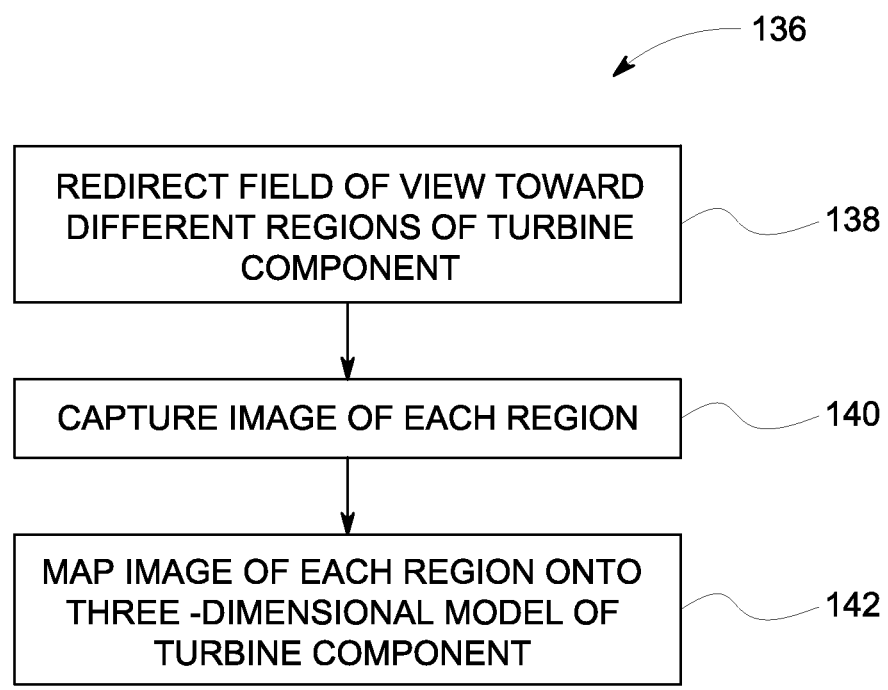
FIG. 7 is a flowchart of an exemplary method for capturing an image of different regions of a turbine component.

FIG. 7 is a flowchart of an exemplary method 136 for capturing an image of different regions of a turbine component. First, as represented by block 138, a field of view is redirected toward different regions of a turbine component while the turbine is in operation. For example, a light redirecting device may be rotated about an axis of rotation to redirect the field of view toward different regions of the turbine component. In addition, the light redirected device may be translated relative to the turbine component, thereby providing a narrower or a wider field of view, for example. Next, as represented by block 140, an image of each region is captured. As previously discussed, a focusing mechanism may be employed to automatically focus each image onto a detector array, thereby compensating for variations in distance between the light redirecting device and the turbine component. By directing a narrow field of view toward different regions of the turbine component, a substantial portion of the surface of the component may be monitored with high spatial resolution. As a result, minute (e.g., less than about 500 micron) defects may be detected within the component, such as blocked cooling holes, cracks, loss of TBC and/or other defects.

In certain embodiments, the image of each region is mapped onto a three-dimensional model of the turbine component, as represented by block 142. For example, the controller may instruct the rotation mechanism to direct the light redirecting device toward desired regions of the component, and to map resultant images of each desired region onto the three-dimensional model of the component. Because an operator may view the two-dimensional image mapped onto the three-dimensional model, the operator may easily associate elements of the image with locations on the turbine component. Consequently, the operator may be able to identify blocked cooling holes within turbine blades, estimate the remaining life of the turbine component and/or determine a desired inspection interval.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
an optical monitoring system comprising:
an optical connection
a light redirecting device coupled to an end of the optical connection an configured to optically communicate with an interior of a rotary machine;
a detector array coupled to an opposite end of the optical connection;
a rotation mechanism configured to rotate the light redirecting device about an axis of rotation to rotatably redirect the field of view of the light redirecting device,
a translation mechanism configured to move the light redirecting device relative to the component; and
a focusing mechanism positioned between the optical connection and the detector array and configured to adjust a focal point for variations in distance between the light redirecting device and the component,
wherein the optical monitoring system is configured to redirect a field of view toward different regions of a component within the interior of the rotary machine while the rotary machine is in operation, and to capture an image of each region.

2. The system of claim 1, wherein the light redirecting device comprises a prism.

3. The system of claim 1, wherein the optical monitoring system comprises a light source configured to illuminate the component.

4. The system of claim 1, wherein the optical monitoring system comprises a controller configured to map the image of each region onto a three-dimensional model of the component.

5. The system of claim 1, wherein the optical monitoring system is configured to optically communicate with the interior of the rotary machine via an inspection port within a casing of the rotary machine.

6. A system comprising:
an optical monitoring system configured to optically communicate with an interior of a rotary machine, wherein the optical monitoring system comprises:
a light redirecting device coupled to an optical connection and configured to redirect a field of view toward different regions of a component within the interior of the rotary machine while the rotary machine is in operation;
a detector array in optical communication with the light redirecting device, wherein the detector array is configured to capture an image of each region;
a rotation mechanism configured to rotate the light redirecting device about an axis of rotation to rotatably redirect the field of view of the light redirecting device,
a translation mechanism configured to move the light redirecting device relative to the component; and
a focusing mechanism positioned between the optical connection and the detector array and configured to adjust a focal point for variations in distance between the light redirecting device and the component,
wherein the optical monitoring system is configured to redirect a field of view toward different regions of a component within the interior of the rotary machine while the rotary machine is in operation, and to capture an image of each region.

7. The system of claim 6, wherein the detector array is optically coupled to the light redirecting device via an optical imaging system.

8. The system of claim 6, comprising a controller Communicatively coupled to the detector array and to the rotation mechanism, wherein the controller is configured to instruct the rotation mechanism to direct the light redirecting device toward desired regions of the component, and to map resultant images of each desired region onto a three-dimensional model of the component.

9. A method of redirecting a field of view toward different regions of a component within an interior of a rotary machine while the rotary machine is in operation, the method comprising:
coupling a light redirecting device to an optical connection;
rotating the light redirecting device about an axis of rotation;
translating the light redirecting device relative to the component;
positioning a focusing mechanism between the optical connection and a detector array;
focusing the image to adjust a focal point for variations in distance between the light redirecting device and the component onto the detector array; and
capturing an image of each region.

10. The method of claim 9, comprising mapping the image of each region onto a three-dimensional model of the component.

* * * * *

UNITED STATES PATENT AND TRADEMARK OFFICE
CERTIFICATE OF CORRECTION

| | | |
|---|---|---|
| PATENT NO. | : 8,431,917 B2 | |
| APPLICATION NO. | : 12/976813 | |
| DATED | : April 30, 2013 | |
| INVENTOR(S) | : Wang et al. | |

It is certified that error appears in the above-identified patent and that said Letters Patent is hereby corrected as shown below:

In the Specification

In Column 4, Line 10, delete "minor," and insert -- mirror, --, therefor.

In Column 7, Line 45, delete "minor," and insert -- mirror, --, therefor.

In Column 8, Line 55, delete "minor" and insert -- mirror --, therefor.

In Column 9, Line 29, delete "minor" and insert -- mirror --, therefor.

In Column 9, Line 30, delete "minor" and insert -- mirror --, therefor.

In Column 9, Line 34, delete "minor" and insert -- mirror --, therefor.

In Column 9, Line 35, delete "minor." and insert -- mirror. --, therefor.

In the Claims

In Column 13, Line 13, in Claim 1, delete "connection an" and insert -- connection and --, therefor.

In Column 14, Lines 24-25, in Claim 8, delete "Communicatively" and insert -- communicatively --, therefor.

Signed and Sealed this
Eighteenth Day of June, 2013

Teresa Stanek Rea
*Acting Director of the United States Patent and Trademark Office*